United States Patent Office 3,556,723
Patented Jan. 19, 1971

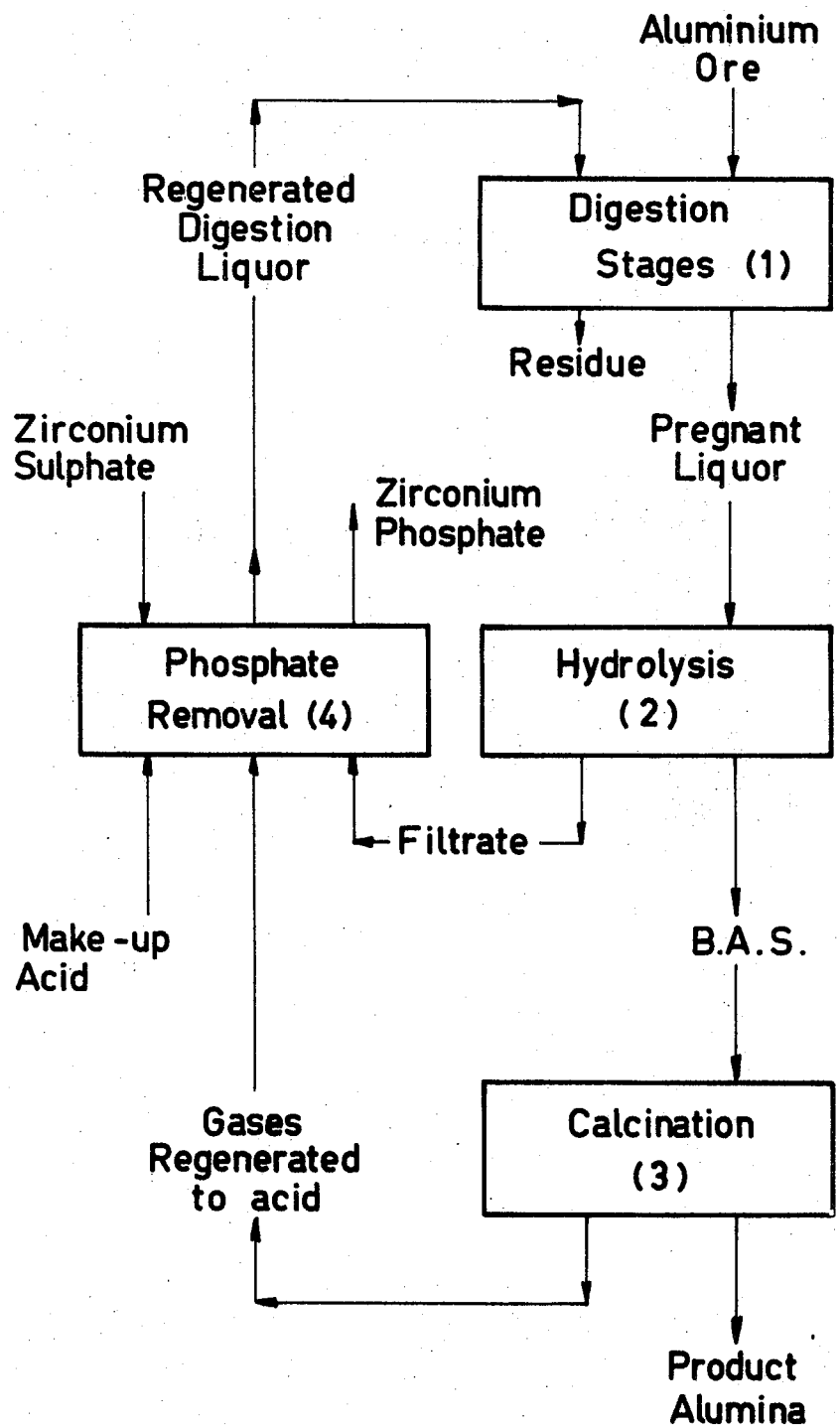

3,556,723
CONTROL OF PHOSPHATE IMPURITIES IN ACID ALUMINA PROCESSES
Thomas R. Scott, Blackburn, Victoria, and Peter T. Davey, Mount Waverley, Victoria, Australia, assignors to Commonwealth Scientific and Industrial Research Organization, East Melbourne, Victoria, Australia, a body corporate
Filed Mar. 13, 1969, Ser. No. 806,945
Claims priority, application Australia, Mar. 21, 1968, 35,386/68
Int. Cl. C22b 59/00
U.S. Cl. 23—123
16 Claims

ABSTRACT OF THE DISCLOSURE

A process is provided whereby the amount of dissolved phosphate impurities in acid aluminium sulphate solutions and liquors may be reduced. An acid soluble compound of at least one metal selected from zirconium, titanium, hafnium and thorium is added to the solution or liquor to precipitate dissolved phosphate impurities as phosphates of the added metal or metals.

To increase the rate of precipitation of the phosphates, the mixture resulting from the addition of the acid soluble compound is heated for a short time.

BACKGROUND OF INVENTION

This invention is concerned with a process for reducing the level of phosphate impurity in acid aluminium sulphate solutions. More specifically it is directed to the use of such methods to provide an improvement in acid processes for the preparation of alumina.

PRIOR ART

Phosphate is an undesirable contaminant in alumina which is to be reduced to the metal, so much so that the specified upper limit is usually set at 0.01% by weight of $P_2O_5$. While the attainment of such a low level of phosphate does not represent a problem in alkaline alumina processes, there are circumstances in which an acid process, such as that of Australian Pat. No. 237,278, is to be preferred; and, in such cases, the removal of phosphate to a desirably low level has hitherto been either extremely difficult or costly to achieve.

Attempts to remove phosphate in acid processes prior to precipitation of basic aluminium sulphate, by such means as selective precipitation, solvent extraction or ion-exchange techniques appear to have been largely unsuccessful due to the presence of complexes involving the phosphate ions. Similarly, efforts aimed at reducing the amount of phosphate present in the basic aluminium sulphate after precipitation, have met with little success, since selective leaching of the phosphate has not been shown to be practical and recrystallization of the aluminium sulphate, while feasible, is economically unattractive.

SUMMARY OF THE INVENTION

It has now been found that phosphate may be precipitated from acid aluminium sulphate solutions or liquors as the salt of certain group IV metals, namely zirconium, titanium, hafnium and thorium. Of these metals, zirconium appears to be the most suitable metal for this purpose. By the addition of an appropriate quantity of an acid soluble zirconium compound, it is possible and practical to reduce the level of dissolved phosphate in acid aluminium sulphate solutions or liquors to below 50 p.p.m.

The phosphates of the other named group IV metals, namely titanium, hafnium and thorium have higher residual solubilities than the phosphate of zirconium and accordingly the use of acid soluble compounds of titanium, hafnium and thorium does not reduce the level of phosphate impurities to the same extent as is brought about by the use of an acid soluble compound of zirconium. Nevertheless, compounds of titanium, hafnium and thorium can be used to substantially reduce the level of phosphate impurities in acid aluminium sulphate solutions or liquors.

Thus, broadly speaking, the present invention provides a process for reducing the level of dissolved phosphate impurity in acid aluminium sulphate solutions or liquors, particularly such aluminium sulphate solutions or liquors as are generated in acid processes for the production of alumina, wherein at least one metal selected from the group comprising zirconium, titanium, hafnium and thorium, is added as an acid soluble compound to the aluminium sulphate solution or liquor, to thereby precipitate dissolved phosphate as a phosphate of the added metal or metals, which may then be removed by suitable means.

It will be evident from the above that the use of such compounds to precipitate dissolved phosphate from acid aluminium sulphate liquors constitutes a potentially valuable improvement in acid processes for the production of alumina, particularly where the alumina is to be reduced to metallic aluminium.

The rate of precipitation of phosphate is slow, even when using a zirconium compound. For example, at ambient temperatures, only about half of the zirconium phosphate can be precipitated in 6 hours and equilibrium is not reached even after 100 hours. It has been found, however, that the precipitation reaction can be accelerated by the use of a conditioning step in which, after the addition of the desired acid soluble compound to the acid aluminium sulphate liquor, the mixture is raised to an elevated temperature for a relatively short period of time; the mixture then being allowed to cool to the temperature at which precipitation is to be completed.

Thus, according to another aspect of the present invention there is provided a process for reducing the level of dissolved phosphate impurity in acid aluminium sulphate liquors, including such aluminium sulphate solutions or liquors as are generated in acid processes for the production of alumina, wherein the acid soluble compound defined above is added to the acid aluminium sulphate liquor, the resultant mixture then being raised to an elevated temperature for a short period of time and then allowed to cool to thereby permit the precipitation of the phosphate, which is then removed by suitable means.

Suitable acid soluble compounds of zirconium, titanium, hafnium and thorium for use in reducing the level of phosphate impurity in acid aluminium sulphate solutions or liquors, are the sulphates, including both basic and acid sulphates, the hydroxides and carbonates. The zirconium compounds are the most suitable for this purpose, the preferred compound being zirconium sulphate. Generally halides and nitrates are not suitable. In the following description, reference will be made primarily to the use of zirconium but it will be understood that this invention is not limited thereto.

The precipitation of phosphate from the acid aluminium sulphate solutions or liquors, by the process of the present invention, using zirconium compounds yields a gelatinous material. The molar ratio $ZrO_2/P_2O_5$ in the precipitate can vary widely, but the trend is towards compounds with a ratio of 1.0 (corresponding to the monohydrogen phosphate) in solutions of about 2 N acidity, and a ratio of 2.0–2.2 at low acidities of about 0.3–0.5 N, where some sulphate tends to substitute for phosphate.

The solubility of the phosphate precipitate is found to increase with the level of free acidity in the aluminium sulphate solution, other variables being held constant. Thus, from this viewpoint, it is desirable to avoid an excessively high free acidity. However, in more acid solutions the zirconium phosphate is precipitated more rapidly to yield a product which, although still somewhat gelatinous, can be more readily separated from the solution. Consequently, the level of free acidity in the aluminium sulphate solution should desirably be such as to achieve a satisfactory balance between the amount of phosphate remaining in the solution and the ease of handling of the zorconium phosphate precipitate. The preferred conditions are generally achieved in 1–2 2.5 N free acidity, although free acidity in the range 0.3–3.0 N can be used if necessary. This balance can be influenced so as to permit the use of a higher level of free acidity, by the addition of excess zirconium compound.

To form a monohydrogen phosphate ($ZrO_2/P_2O_5$ of 1.0) the theoretical requirement is for 260 p.p.m. $ZrO_2$ (added as zirconium sulphate, in this case) per 300 p.p.m. of phosphate calculated as $P_2O_5$. However, it is found that an excess of zirconium compound is usually required before any precipitation will occur. An excess of twice the theoretical amount is required at room temperature to precipitate 65–70% of the phosphate, and a greater excess is required to bring the residual concentration of phosphate in solution down to 40–50 p.p.m. (corresponding to about 0.01% by weight $P_2O_5$ in the alumina derived from the aluminium sulphate solution).

Although a coagulated precipitate is formed more quickly at higher temperatures, it is found that the residual solubility of the zirconium phosphate increases with temperature. However, as with the use of relatively large amounts of free acid, the increase in the rate of formation of precipitate due to heating also improves the form of the precipitate. Thus it may be desirable again to achieve a balance between the amount of phosphate remaining in solution and the ease of handling of the precipitate.

The concentration of the aluminium sulphate solution is also significant since aluminium sulphate has a powerful complexing effect on phosphate. The complexing effect increases with increase in aluminium sulphate concentration, and generally phosphate can be adequately precipitated from solution by the addition of economic amounts of the soluble zirconium compound if the aluminium sulphate concentration is not more than about 60 gms. per litre (calculated as alumina equivalent). The preferred aluminium sulphate concentration is 40–50 gms. per litre (alumina equivalent) although concentrations considerably below this range can be employed if desired.

As previously indicated, precipitation at ambient temperatures or even with moderate heating, but without the use of the conditioning, treatment, is relatively slow. However, by the use of the conditioning treatment, equilibrium of the precipitation reaction is nearly attained over a period of 3–6 hours at room temperature; the additional precipitation after a further 14 hours being insignificant. For example, an adequate conditioning treatment can be achieved by heating the mixture of acid aluminium sulphate solution and soluble zirconium compound to a temperature of at least 130° C., but preferably not above 220° C., for a period of up to an hour, but preferably of the order of 15–30 minutes. The preferred temperature range for the conditioning treatment is 180°–220° C. However, in acid alumina processes, the normal operation can achieve the necessary conditioning of the mixture of acid aluminium sulphate solution and soluble zirconium compound, as will become evident from the following discussion.

In the operation of an acid alumina process, it is found that the optimum conditions for phosphate precipitation that are possible within the process limitations, such as aluminium sulphate concentration and free acidity are generally only obtained in the filtrate liquors from the hydrolysis stage, and especially in these liquors after they have been further acidified for recycling to the digestion stage of the cyclic process. Thus, it is usually only in these filtrate liquors that successful precipitation of zirconium phosphate can be achieved.

In such a cyclic operation, some phosphate will therefore inevitably be present in the liquor, during hydrolysis, being derived in part from the fresh aluminium ore added to the system, and in part from the phosphate (40–50) p.p.m. remaining in the recycled acid liquors after the zirconium phosphate precipitation stage. However, as the phosphate content of the basic aluminium sulphate, precipitated during and after the hydrolysis stage, is not to exceed 0.004% by weight, calculated as $P_2O_5$ (so that an alumina product with not more than 0.01% by weight of phosphate, calculated as $P_2O_5$ may be produced) it is necessary to ensure that the concentration of phosphate in the pregnant liquor derived from these two sources should not exceed about 300 p.p.m. phosphate, calculated as $P_2O_5$. In other words, the object of the present invention in such a process is primarily to prevent the buildup of phosphate in the process liquors due to the cyclic operation, rather than to eliminate phosphate completely from the circuit prior to precipitation of the basic aluminium sulphate. Consequently, it will be appreciated that the use of the present invention in acid alumina processes is principally directed to the treatment of ores containing a limited amount of phosphate impurity, preferably not more than 5 parts of soluble $P_2O_5$ per 1000 parts of soluble alumina, or to the treatment of ores in which the amount of phosphate impurity has been first reduced to such a level by suitable means, whether prior to or during the acid alumina process.

DESCRIPTION OF PREFERRED EMBODIMENT

By way of example, the use of the present invention will now be described with reference to an acid alumina process, depicted in the accompanying flow sheet. In this, crushed aluminium ore containing phosphate impurity is digested in stage 1, which may comprise two countercurrent digestion stages, using recycled acid liquor, under pressure and with agitation and aeration, at temperatures in excess of 100° C. The time of digestion may be up to about one hour, after which the solid residue is filtered off and is discarded. The pregnant liquor then passes to stage 2, where it is hydrolsed by heating for a period at a temperature in the range of 150°–250° C. to bring about precipitation of basic aluminium sulphate (B.A.S.). After cooling and filtration, the precipitate is calcined at stage 3 at a temperature in the range of 1000° C.–1200° C. Some of the iron inevitably introduced into the system in the aluminium ore will be precipitated during stage 1 but it will generally be necessary to also employ a suitable reduction stage, not shown, between stages 1 and 2 in order to convert any ferric iron present in the pregnant liquor from stage 1 to the ferrous state, to thereby prevent contamination of the basic aluminium sulphate precipitated in stage 2.

The free acidity of the filtrate from stage 2 is adjusted by the addition at stage 4 of acid regenerated from the sulphur dioxide bearing gases from calcining stage 3, together with make-up acid. A solution of a zirconium compound is also added at stage 4 in a quantity sufficient to ensure precipitation of the desired quantity of dissolved phosphate, as has been described, to precipitate zirconium phosphate. This precipitate is removed by filtration or centrifuging, and treated by suitable methods to regenerate the zirconium compound solution. The filtrate from stage 4 is recycled to stage 1 where it is contacted with fresh ore.

As previously discussed, an excess of zirconium compound will be required in stage 4. However in stage 4 it will remain in solution and be carried successively through stages 1 and 2. In this way, this recycled zirconium compound, together with aluminium sulphate present in stages 1 and 2, will be subject to temperatures in the range 130° C.–220° C. for prolonged periods, thereby inevitably receiving a more than adequate conditioning treatment. It will be evident from this that a separate conditioning stage is therefore not necessary in such circumstances. Moreover, it will also be apparent that the zirconium compound added to stage 4 is only to replace the zirconium removed from the system as zirconium phosphate and, as indicated, this is preferably regenerated from the latter.

Those skilled in the art will realize that modifications, other than those described can be made to the method of our invention. It is to be understood that the invention includes all such modifications which fall within its spirit and scope.

We claim:

1. A process for reducing the level of dissolved phosphate impurity in an acid aluminium sulphate solution comprising adding to said aluminium sulphate solution, as an acid soluble compound, the sulphate, carbonate or hydroxide of at least one metal selected from the group consisting of zirconium, titanium, hafnium and thorium, whereby dissolved phosphate precipitates as a phosphate of the added metal(s).

2. A process as claimed in claim 1, including the further step of removing the precipitate of phosphate of the added metal(s).

3. A process as claimed in claim 2, in which the precipitate is removed by filtration.

4. A process as claimed in claim 2, including the further steps of treating the precipitate to generate the acid soluble compound and recycling the acid soluble compound thus obtained.

5. A process as claimed in claim 1, in which the aluminium sulphate solution is produced in an acid process for the production of alumina.

6. A process as claimed in claim 5, in which the said solution is obtainend from a hydrolysis stage filtrate liquor.

7. A process as claimed in claim 5, in which the said solution is obtained from a hydrolysis stage filtrate liquor that has been acidified for recycling to a digestion stage of a cyclic acid process.

8. A process as claimed in claim 1, in which the amount of phosphate in the aluminium solution does not exceed 300 p.p.m.

9. A process as claimed in claim 5, in which the amount of phosphate in the aluminium sulphate solution does not exceed 5 parts (calculated as $P_2O_5$) per 1000 parts of alumina dissolved in the solution.

10. A process as claimed in claim 1, in which, after the acid soluble compound has been added to the aluminium sulphate solution, the resulting mixture is heated to a temperature of 130°–220° C. for up to 1 hour.

11. A process as claimed in claim 10, in which the mixture is heated to a temperature of 180°–220° C.

12. A process as claimed in claim 11, in which the mixture is heated for from 15 to 30 minutes.

13. A process as claimed in claim 1, in which the acid soluble compound is zirconium sulphate.

14. A process as claimed in claim 1, in which the acid aluminium sulphate solution or liquor has a free acidity of from 0.3 to 3.0 N.

15. A process as claimed in claim 14, in which the free acidity is from 1 to 2.5 N.

16. A process as claimed in claim 1, in which the quantity of acid soluble compound used is at least twice that required theoretically to produce a monohydrogen phosphate.

References Cited

UNITED STATES PATENTS

| | | |
|---|---|---|
| 2,557,891 | 6/1951 | Porter. |
| 2,843,456 | 7/1958 | Porter. |
| 2,850,358 | 9/1958 | Reeve. |
| 3,201,193 | 8/1965 | Baumann. |

OSCAR R. VERTIZ, Primary Examiner

G. O. PETERS, Assistant Examiner

U.S. Cl. X.R.

23—105